Feb. 10, 1925. 1,525,826
D. PERLMAN
MOTOR DRIVEN TOOL
Filed Jan. 30, 1923  2 Sheets-Sheet 2
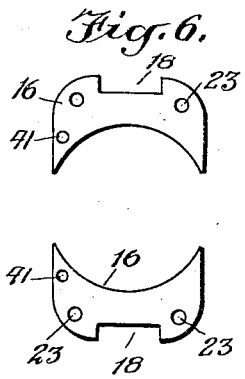
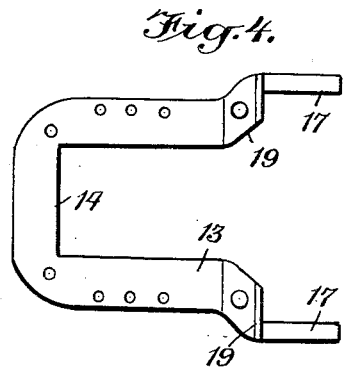
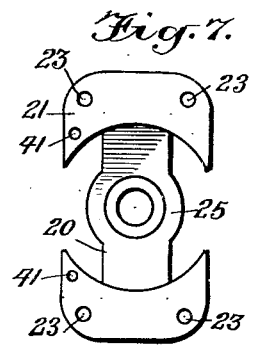
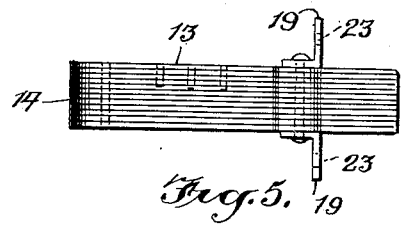
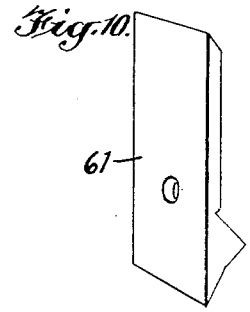
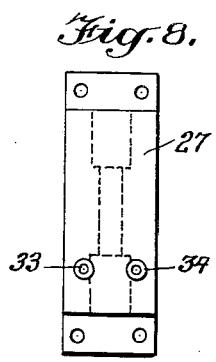
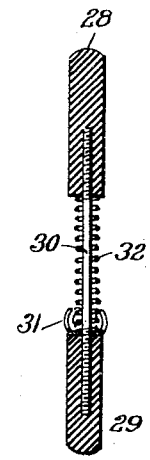
Inventor
David Perlman
By his Attorneys
Dean, Fairbank Albright & Hirsch Patented Feb. 10, 1925.

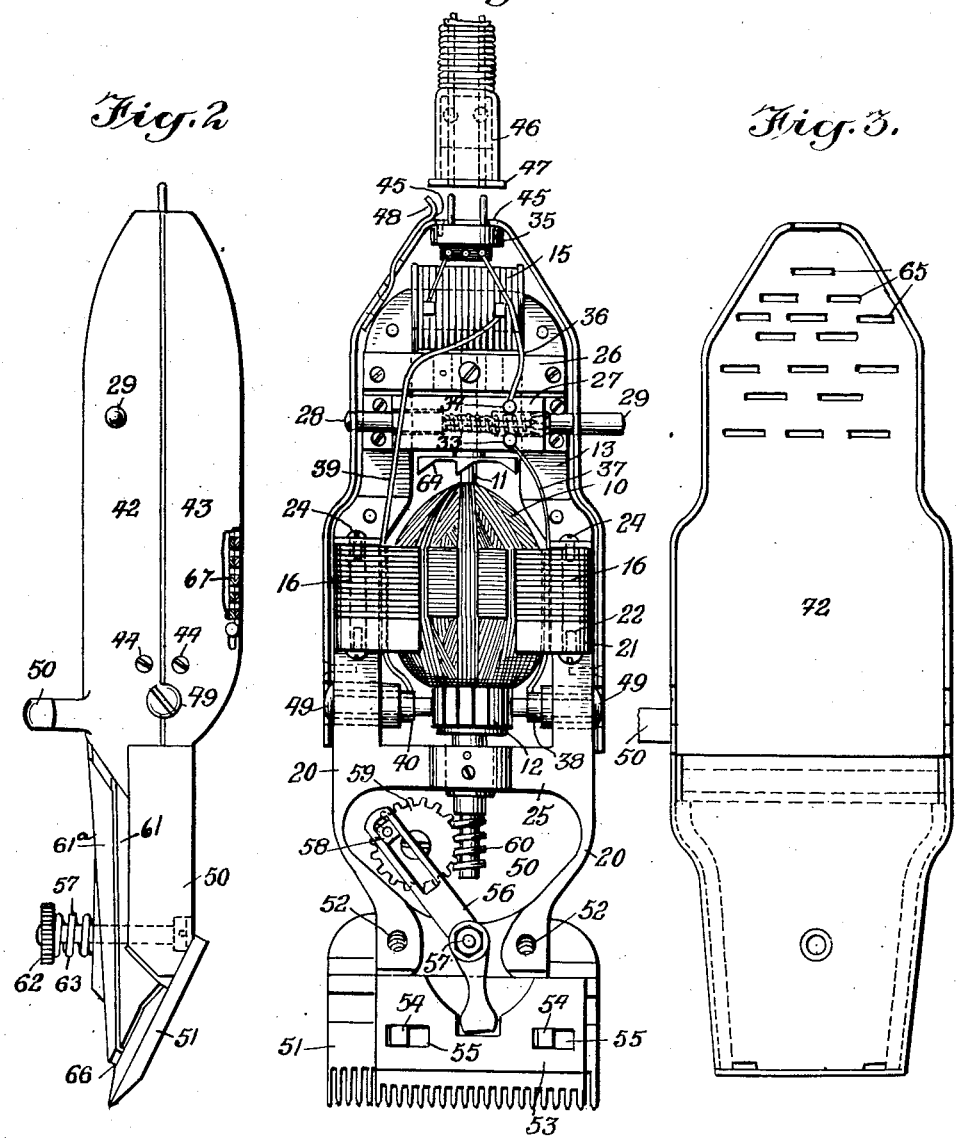

1,525,826

UNITED STATES PATENT OFFICE.

DAVID PERLMAN, OF LOS ANGELES, CALIFORNIA.

MOTOR-DRIVEN TOOL.

Application filed January 30, 1923. Serial No. 615,820.

*To all whom it may concern:*

Be it known that I, DAVID PERLMAN, a citizen of Russia, and resident of Los Angeles, in the county of Los Angeles and State of California, have invented certain new and useful Improvements in Motor-Driven Tools, of which the following is a specification.

This invention is an improvement in motor driven tools of that type in which the electric motor is of small size and mounted in the handle of the tool. The invention relates particularly to the construction of the motor, and one object is to provide a motor of such form as will render it applicable for use where a motor of the ordinary cylindrical type occupies too much space for the desired power output.

A further object is to secure the maximum power for the minimum space or thickness, my improved motor being not materially thicker than the diameter of the armature.

As one important feature of my improved construction I support the armature shaft from a pair of yokes which are connected to the opposite sides of the field poles, one of the yokes having its intermediate portion serving as a core for the field coil.

As a further feature I form the field poles of laminations and interlock them in an effective manner to one of the yokes extending at right angles to the laminations. This permits of rigid construction of considerably larger size in respect to the diameter of the armature and the thickness of the motor than is possible in other constructions.

As a further feature I support the armature shaft in bearings carried in a novel manner by the field coil core, and so mounted and designed as to not interfere with the proper flow of the magnetic lines of force in the core.

As a further feature I provide a novel form of controlling switch so mounted in the casing of the motor as to be readily operated by the same hand that carries the motor and tool.

A further object of my invention is to provide a simple compact construction of motor, inexpensive to manufacture and assemble, and adapted for use with either a direct or an alternate current.

A further feature is involved in the means employed for cooling the motor and blowing particles away from the cutting or other work engaging parts.

Various other objects, advantages and novel features will be pointed out hereinafter, or will be apparent from a consideration of the specific embodiment hereinafter described.

My improved construction is applicable for use in or as a part of various kinds of tools, and I do not wish to be limited to the kind or details of the motor driven parts. Certain features render it particularly applicable to clippers, although the motor driven parts may be used in or adapted for operating the work engaging parts of diamond setters, scissors, vibrators, perforators, drills, stipplers, and cutters for various kinds of material, and for various other motor driven, hand-operated tools of small size.

In the accompanying drawings:

Fig. 1 is a top plan view, the cover of the casing being removed.

Fig. 2 is a side elevation.

Fig. 3 is an inverted plan view of the top cover member.

Fig. 4 is a side elevation of the yoke forming a part of the field for supporting and connecting the field coil and pole pieces.

Fig. 5 is an edge view of the parts shown in Fig. 4.

Fig. 6 is a face view of the field poles.

Fig. 7 is an end view of the yoke for the opposite end of the motor.

Fig. 8 is a plan view of the switch support.

Fig. 9 is a longitudinal section through the switch element.

Fig. 10 is a perspective view of the cover plate.

In the specific construction of motor illustrated, the armature 10 is of the usual construction and is mounted with its axis extending lengthwise and within the handle of the tool to be driven. The armature is mounted on a shaft 11, and has the usual commutator 12. The construction and arrangement of the field embodies one important feature of my invention. The field includes a yoke 13 shown particularly in Figs. 4 and 5. It is made up of a series of laminations and has a center or intermediate portion 14 serving as the core of the field coil 15, or around which the wire is wound to form such coil. The field poles 16 are also formed of a series of laminations or plates, shown particularly in Fig. 6. These plates are disposed in planes at right angles to the axis of the armature, while the laminations of the yoke 13 lie in planes parallel to the armature axis. The yoke terminates in fingers or projections 17 which enter recesses or notches 18 in the outer edges of the plates 16 so as to hold all of the plates in proper registry and in proper relationship to the remainder of the field. There is thus produced a magnetic field of the highest efficiency in which magnetic losses, the formation of eddy currents and heating effects are eliminated as much as possible. The yoke also has angle pieces 19 riveted or otherwise rigidly secured thereto and at the inner or base ends of the fingers 17 to serve as stops for the field poles. The plates 16 are placed against the brackets 19, and with the fingers 17 lying in the notches 18. The parts are then riveted or otherwise rigidly secured in this position preferably as hereinafter described.

At the end of the motor opposite to the yoke 13 there is a second yoke 20 which is also rigidly secured to the field poles 16, but is either insulated therefrom or is formed of non-magnetic material. Preferably this yoke 20 is formed of aluminum and has terminal flanges 21 of substantially the same size as the plates 16 of the field poles. For rigidly connecting the two yokes with the plates 16 therebetween, I preferably employ hollow non-magnetic rivets 22 extending through registering apertures 23 in the brackets 19, pole plates 16 and the flanges 21. Screws 24 extend into the ends of these hollow rivets for holding the parts together.

It will be noted that the main frame of the motor is formed by the two yokes 13 and 20 spaced by and secured to the field pole plates 16. The shaft 11 of the armature is mounted in this frame. The yoke 20 has a transverse bar portion 25 serving as one support for a shaft bearing. Extending transversely of the other yoke 13 I provide a bar portion 26 which may be of aluminum or other non-magnetic material or effectively insulated from the yoke and serving to support a bearing for the other end of the armature shaft. This bearing comes between the field coil 15 and the armature so that a prolongation of the axis of the armature would intersect the axis of the field coil 15.

For controlling the motor I provide a switch in the circuit and mounted directly on the main frame of the motor. As shown, this includes a transverse bar portion 27. This is shown particularly in Fig. 8. It may be formed of bakelite or any other suitable insulation material, and may extend across and be mounted on either of the two yokes. If mounted on the yoke 20 it might come directly over the commutator. To simplify illustration I have shown the side members of the yoke 13 of sufficient length to permit the mounting of this switch supporting member 27 between the bearing supporting bar 26 and the armature. Within the bar 27 is mounted a reciprocatory member including a pair of terminals 28—29 adapted to serve as push buttons, and a connecting rod 30. Slidably mounted on the rod, between the two push buttons, is a contact member 31 pressed toward the button 29 by a coil spring 32. The bar 27 has an axial passage therethrough, the terminal portions being of the proper diameter to receive the push buttons, and the intermediate portion being of smaller diameter to receive the coil spring 32. The bar adjacent to one end has a pair of contacts 33—34 to which wires may be connected and which have portions within the path of movement of the contact member 31. In the operation of the switch the button 29 may be pushed in, to force the contact member 31 between the two contacts or terminals 33—34. The contact 31 is preferably made resilient so that it may be forced between the parts 33—34 and be firmly held in position. When it is desired to break the circuit the button 28 is moved inwardly and during the first part of this movement the contact member 31 will remain in place between the terminals 33 and 34 and the spring 32 will be compressed. After the spring has been compressed to a predetermined extent it will force the contact member 31 out from between the terminals 33—34, and will thus make a quick break of the circuit. Preferably the contact member 31 is of such diameter that it frictionally engages the passage in the member 27 so that when the circuit is once broken the push button 28 will stay in until the contact 31 is positively returned to circuit closing position by pressure on the button 29.

The motor may be wired in the usual manner. As shown there is a terminal plug 35 from which a wire 36 leads to the terminal 34 of the switch. A wire 37 leads from the switch terminal 33 to one of the brushes 38, and a wire 39 leads from the other brush 40 to the field coil 15. The other terminal of the field coil leads to the terminal plug 35. Any other suitable wiring may be employed, depending upon the location of the switch and the specific design of the motor. To economize in space the plates 16 of the pole pieces and the flanges 21 of the yoke 20 are provided with registering apertures 41 through which the wires 37 and 39 may pass. The commutator is preferably at the end of the motor opposite to the field coil, and this permits the mounting of the brushes 38 and 40 in the sides of the yoke 20 which, as previously stated, is of aluminum or other non-magnetic material, or insulated from the field.

The frame which includes the two yokes 13 and 20, serves to support a casing for enclosing the motor parts, and this casing forms the handle of the tool. The casing is preferably made up of two sections 42 and 43 forming top and bottom walls and meeting in the medial plane of the motor defined by the axis of the armature and the axis of the field coil. The casing sections may be secured to the frame in any suitable manner as for instance by screws 44 entering the sides of the yoke 20. Additional screws 45 may connect both casing sections to the terminal plug 35 to hold the casing sections together and to support the terminal plug. The cable containing the wires for delivering current to the motor may terminate in a socket 46 having apertures to receive the terminal pins on the plug 35, and this socket may have a flange 47 which will snap beneath a spring catch 48 carried by one of the casing sections and serving to prevent the accidental separation of the cable from the instrument. One of the casing sections may have appropriately located apertures through which the push buttons extend, and there may be apertures or recesses through which the brush holders 49 may be adjusted. The upper casing section or cover preferably has a thumb hook 50 to facilitate the proper gripping or retaining of the instrument in the hand.

I have illustrated my improved device as forming a part of a clipper in which there is a movable blade operated by the motor. As shown the yoke 20 has a lower wall or extension 50ª to which a stationary blade 51 is secured by screws passing through apertures 52. This blade 51 has teeth and serves as a support for a reciprocatory blade 53 also having a plurality of teeth. The blade 53 is guided on the blade 51 by studs 54 projecting up from the stationary blade and disposed within the slots 55 in the movable blade. For reciprocating the movable blade there is provided a bell crank lever 56 mounted on a pivot 57 and having one end engaging with the movable blade. The other end is slotted to receive a crank pin 58 on a gear 59 meshing with a worm 60 on the armature shaft. I do not claim anything particularly novel in this specific driving mechanism between the operating part 53 and the motor. Various other power transmitting mechanisms might be employed and with appropriate design in accordance with the character of the part to be gripped.

Over the power transmitting mechanism is a cover plate 61, shown in Fig. 10, which fits snugly with an air tight packing around the edges and prevents dust from getting to the moving parts and prevents oil or grease from splashing out. Over the cover plate 61 is a flattened tubular cover 61ª. Both the parts 61 and 61ª are held in place by a thumb nut 62 and spring 63 on an extension of the bolt 57 which serves as the pivot for the bell crank lever 56.

As one important feature of my invention the armature shaft at the end opposite to the working parts is provided with a fan 64 which operates to draw in air through slots or perforations 65 in the rear end portion of one or both of the casing sections 43—43. This air blown by the fan passes lengthwise of the armature and tends to keep the motor in a cool and proper working condition. The air passes from the armature through the cover plate 61ª and escapes through slots or apertures 66 directly above the blade 53 and close to the operating edge of the latter. Thus the fan serves not only to cool the motor but also to deliver a blast adjacent to the working part and remove clippings or other particles which may be cut off by the blade or other working part. This is particularly important if the device be employed as a hair clipper, as the blast of air continually removes the small particles of hair from the blades to prevent them from becoming entangled in the teeth, and to permit the operator to better watch the operation and guide the instrument.

Preferably one of the casing sections, for instance the bottom 43, is also perforated at a point adjacent to the armature, and is provided with a shutter 67 which may be moved to bring its apertures into or out of registry with those of the closure plate. Thus if it is not desired to blow air to the blade or other work engaging part the shutter may be opened and the fan circulate air over the motor and out through the perforations at the shutter.

Having thus described my invention, what I claim as new and desire to secure by Letters Patent is:

1. A tool having a handle serving as a casing for a motor to operate the tool, said motor including a rotary armature with its axis extending lengthwise of the handle and a field having laminated pole pieces with the laminations in planes at right angles to the armature axis, and a laminated yoke connecting the pole pieces and having its laminations in planes parallel to the armature axis.

2. A tool having a handle serving as a casing for a motor, said motor including a rotary armature with its shaft extending lengthwise of the handle and a field having laminated pole pieces with laminations in planes at right angles to the armature shaft, and a yoke connecting the pole pieces and disposed in a plane including the axis of the armature, and having a portion at one end of the armature serving as the core of the field coil.

3. A tool having a handle serving as a casing for a motor, said motor including a rotary armature with its shaft extending lengthwise of the handle and a field having laminated pole pieces with the laminations in planes at right angles to the armature shaft, a yoke connecting the pole pieces and disposed in a plane including the axis of the armature and having a portion at one end of the armature serving as the core of the field coil, and a coil encircling said core and having its axis at right angles to the axis of the armature.

4. A motor including a rotary armature, a field having laminated pole pieces with the laminations in planes at right angles to the axis of the armature, and a laminated yoke connecting the pole pieces with the laminations in planes parallel to the axis of the armature, and a field coil encircling a portion of said yoke at one end of the armature and with its axis at right angles to the armature axis.

5. A motor having pole pieces made up of laminations, each having an aperture therein, a yoke having a central portion serving as a core for a field coil and having terminal portions extending through said apertures, brackets secured to said yoke, and means for clamping said pole pieces to said brackets.

6. A motor having pole pieces made up of laminations, a yoke having a central portion serving as a core for a field coil, a second yoke independent of the field and presenting terminal flanges, brackets on said first mentioned yoke, and means for clamping the pole pieces between said flanges and said brackets.

7. An electric motor for hand tools including a pair of yokes, pole pieces supported between said yokes, an armature having its opposite ends supported by said yokes, and a casing including a pair of casing sections each secured to one of said yokes.

8. An electric motor for hand tools including a pair of yokes, pole pieces supported between said yokes, an armature having its opposite ends supported by said yokes, and a casing including a pair of casing sections each secured to one of said yokes, said sections meeting in a plane including the axis of the motor.

9. An electric motor for hand tools, including a frame having an intermediate portion serving as field poles, an armature supported between said poles, a field coil encircling a portion of said frame beyond one end of the armature, and a casing having a pair of opposite sections secured to said frame and meeting in a plane including the axis of the armature.

10. An electric motor for hand tools, including a frame having an intermediate portion serving as field poles, an armature supported between said poles, a field coil encircling a portion of said frame beyond one end of the armature, a casing having a pair of opposite sections secured to said frame and meeting in a plane including the axis of the armature, and a cable connection presenting motor terminals and disposed within said casing.

11. An electric motor for hand tools, including a frame having an intermediate portion serving as field poles, an armature supported between said poles, a field coil encircling a portion of said frame beyond one end of the armature, a casing having a pair of opposite sections secured to said frame and meeting in a plane including the axis of the armature, and a cable connection presenting motor terminals and disposed within said casing beyond the field coil, and supported by said casing independently of the frame.

12. An electric motor for hand tools, including a frame having an intermediate portion serving as field poles, an armature supported between said poles, a field coil encircling a portion of said frame beyond one end of the armature, a casing secured to said frame, and a cable connection presenting motor terminals and disposed within said casing beyond the field coil, and supported by said casing independently of the frame.

13. An electric motor for hand tools, including a frame having an intermediate portion serving as field poles, an armature supported between said poles, a field coil encircling a portion of said frame beyond one end of the armature, a casing having a pair of opposite sections secured to said frame and meeting in a plane including the axis of the armature, a cable connection presenting motor terminals and disposed within said casing, and a spring retainer carried by said casing and engaging with said cable connection.

14. An electric motor for hand tools, including a frame having an intermediate portion serving as field poles, an armature supported between said poles, a field coil encircling a portion of said frame beyond one end of the armature, a casing secured to said frame, a cable connection presenting motor terminals and disposed within said casing, and a spring retainer carried by said casing and engaging with said cable connection.

15. A tool having a handle serving as a casing for a motor to operate the tool, said motor including a rotary armature with its axis extending lengthwise of the handle, and a field having laminated pole pieces the laminations being in planes at right angles to the armature axis, a yoke connecting the pole pieces and having a field coil encircling the center portions thereof, a second yoke connecting said pole pieces, a transverse bar carried by said first mentioned yoke and bearings for said armature mounted in said bar and said second mentioned yoke.

16. A tool having a handle serving as a casing for a motor to operate the tool, said motor including a rotary armature with its axis extending lengthwise of the handle, and a field having pole pieces, a yoke connecting the pole pieces and having a field coil encircling the center portions thereof, a second yoke connecting said pole pieces, a transverse bar carried by said first mentioned yoke and bearings for said armature mounted in said bar and said second mentioned yoke.

17. A tool having a handle serving as a casing for a motor to operate the tool, said motor including a rotary armature with its axis extending lengthwise of the handle, a pair of yokes, one of said yokes being laminated and constituting a portion of the field member, pole pieces supported between said yokes, a field coil encircling the intermediate portion of the laminated yoke, and an armature having its supports carried by said yokes.

18. A tool having a handle serving as a casing for a motor to operate the tool, said motor including a rotary armature with its axis extending lengthwise of the handle, a pair of yokes, pole pieces secured therebetween, a transverse bar on one of said yokes, and a switch carried by said last mentioned bar and including portions projecting through the wall of said casing.

19. A tool having a handle serving as a casing for a motor to operate the tool, said motor including a rotary armature with its axis extending lengthwise of the handle, a pair of pole pieces, a pair of yokes secured to said pole pieces and serving to support said armature, a fan driven by said armature and disposed at the end thereof opposite to the tool, said casing extending to a point adjacent said tool for the delivery of air from said fan to the latter.

20. A tool having a handle serving as a casing for a motor to operate the tool, a rotatable armature mounted within said casing and having its axis extending lengthwise thereof, a work engaging part at one end of said casing, a fan driven by said armature at the end thereof opposite to said work engaging part, said casing extending beyond said armature to a point adjacent to said work engaging part for conducting air from said fan to said part.

Signed at Los Angeles city in the county of Los Angeles and State of California this 12th day of January A. D. 1923.

DAVID PERLMAN.